(12) United States Patent
Ishihara et al.

(10) Patent No.: US 8,212,971 B2
(45) Date of Patent: Jul. 3, 2012

(54) POLARIZER, METHOD OF MANUFACTURING POLARIZER AND LIQUID CRYSTAL PROJECTOR

(75) Inventors: Hirotsugu Ishihara, Tokyo (JP); Masanobu Tanaka, Kanagawa (JP); Toshiki Shimamura, Kanagawa (JP); Takahiro Kamei, Kanagawa (JP)

(73) Assignee: Sony Corporation, Tokyo (JP)

( * ) Notice: Subject to any disclaimer, the term of this patent is extended or adjusted under 35 U.S.C. 154(b) by 621 days.

(21) Appl. No.: 12/286,215

(22) Filed: Sep. 29, 2008

(65) Prior Publication Data

US 2009/0109355 A1   Apr. 30, 2009

(30) Foreign Application Priority Data

Oct. 29, 2007   (JP) ................ P2007-280387

(51) Int. Cl.
*G02F 1/1335* (2006.01)
(52) U.S. Cl. ............................. 349/96; 349/5
(58) Field of Classification Search .............. None
See application file for complete search history.

(56) References Cited

U.S. PATENT DOCUMENTS

| | | | |
|---|---|---|---|
| 6,122,103 A | 9/2000 | Perkins et al. | |
| 7,499,111 B2 * | 3/2009 | Hirata et al. | 348/744 |
| 7,862,860 B2 * | 1/2011 | Carmichael et al. | 427/304 |
| 2006/0061862 A1 * | 3/2006 | Mi et al. | 359/486 |

FOREIGN PATENT DOCUMENTS

| | | |
|---|---|---|
| JP | 10-153760 | 6/1998 |
| JP | HEI 10-153760 | 6/1998 |
| JP | 2001-74935 | 3/2001 |
| JP | 2001-074935 | 3/2001 |
| JP | 2005-70456 | 3/2005 |
| JP | 2005-070456 | 3/2005 |
| JP | 2006-84776 | 3/2006 |
| JP | 2006-084776 | 3/2006 |
| JP | 2006-291269 | 10/2006 |
| JP | 2006-291270 | 10/2006 |
| JP | 2007-047251 | 2/2007 |
| JP | 2007-052317 | 3/2007 |
| JP | 2007-100139 | 4/2007 |
| JP | 2008-004304 | 1/2008 |
| JP | 2008-233448 | 10/2008 |
| JP | 2008-256883 | 10/2008 |
| WO | WO 97-34025 | 9/1997 |

OTHER PUBLICATIONS

Matsuo, Tadashi, "A Technical Trend of MD Rear Projection TV", Internet <URL: http://www.polatechno.co.jp/contents/tech/ public/ pdf/0006/MDRPTV.pdf>, pp. 7-8.
A technical trend of MD rear projection TV.

* cited by examiner

*Primary Examiner* — Richard Kim
(74) *Attorney, Agent, or Firm* — Robert J. Depke; Rockey, Depke & Lyons, LLC

(57) ABSTRACT

A polarizer capable of being manufactured in simple steps, and a method of manufacturing the polarizer, as well as a liquid crystal projector are provided. The polarizer includes a substrate having light permeability, and a plurality of linear projections being arranged on the substrate and extending along one direction within a plane thereof. Each of the linear projections having a base layer and a plating layer in the named order from the substrate, the base layer containing a catalyst material for electroless plating process, and the plating layer being deposited by using the base layer as a catalyst.

4 Claims, 7 Drawing Sheets

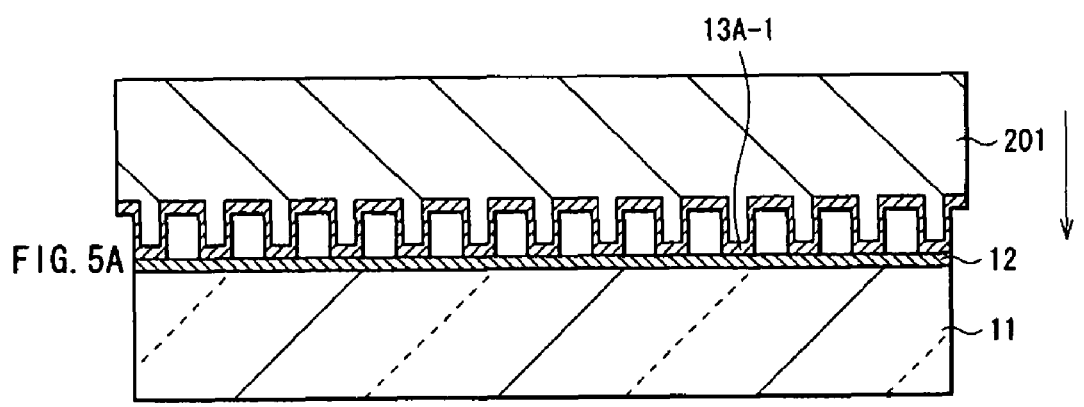
FIG. 5A
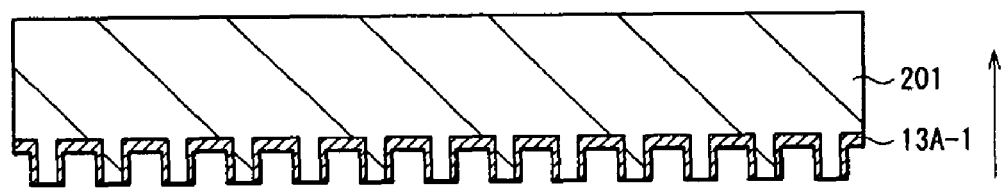
FIG. 5B
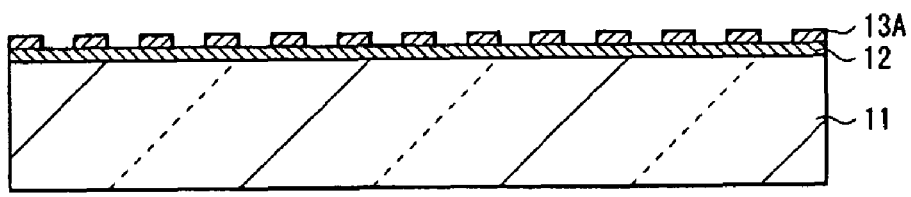

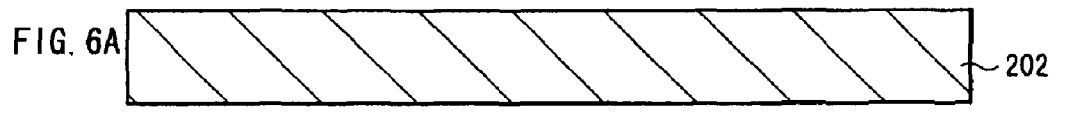
FIG. 6A
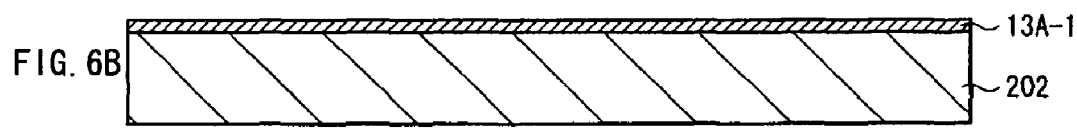
FIG. 6B
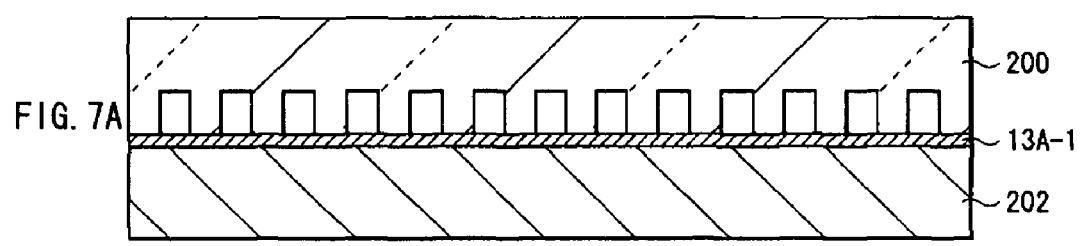
FIG. 7A
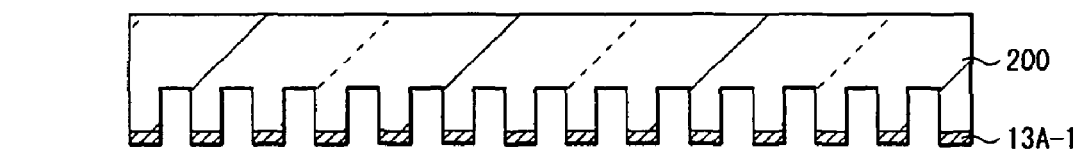
FIG. 7B

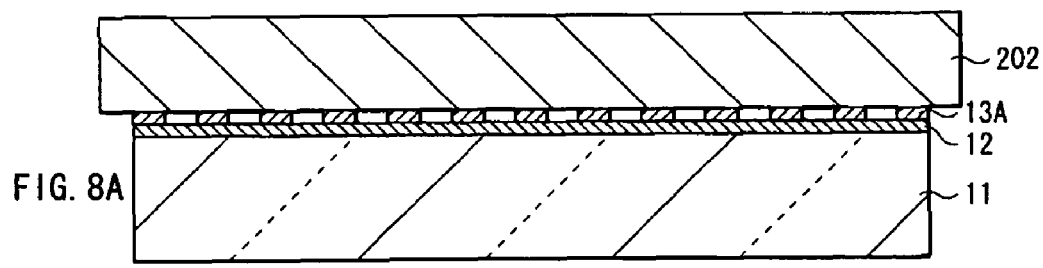
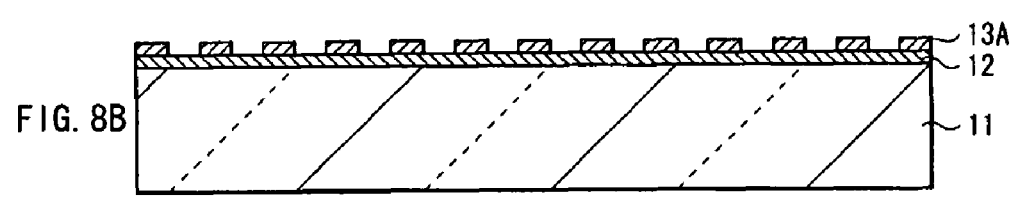
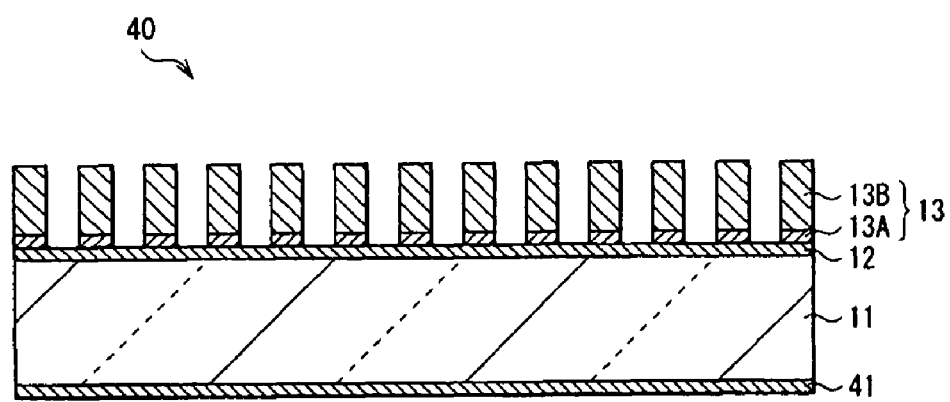
FIG. 9

POLARIZER, METHOD OF MANUFACTURING POLARIZER AND LIQUID CRYSTAL PROJECTOR

The present invention contains subject matter related to Japanese Patent Application JP 2007-280387 filed in the Japanese Patent Office on Oct. 29, 2007, the entire contents of which being incorporated here by reference.

BACKGROUND OF THE INVENTION

1. Field of the Invention

The present invention relates to a wire grid polarizer composed of an inorganic material, a method of manufacturing the wire grid polarizer, and a liquid crystal projector provided with the polarizer.

2. Description of the Related Art

Polarizers used in liquid crystal displays are generally classified as those composed of organic materials and those composed of inorganic materials (refer to the document "MD rear projection TV Technology Trend," pp.7-8 [online], written by Tadashi Matsuo of Polatechno Co., Ltd., Internet <URL: http://www.polatechno.co.jp/contents/tech/public/pdf/0006/MDRPTV.pdf>). In particular, in the recent front or rear projection televisions intended for high luminance, optical elements composed of inorganic materials, such as wire grids, are increasingly used to improve the durability of optical components as the entire optical block becomes smaller due to the miniaturization of liquid crystal panels.

The polarizers composed of organic materials can be fabricated by stretching a film with the organic material coated thereon. On the other hand, the wire grids formed by inorganic materials necessitate the formation of a metal layer on a substrate such as glass, and patterning process using microfabrication technique. In particular, to obtain a desired characteristic in the visible light region, it is necessary to form a minute pattern in the submicron range. As shown in FIG. 11, such a minute wire grid is fabricated in a first method including the step of forming a metal layer composed of aluminum (Al) or the like on a glass substrate 101, and the step of forming minute linear projections 102A by patterning the metal layer with lithography method (for example, refer to U.S. Pat. No. 6,122,103).

Recently, several other manufacturing methods have also been proposed. That is, a second method employs lithography method and lift-off method using electron beam and X-rays (refer to Japanese Unexamined Patent Application Publication No. 10-153760). A third method includes the step of forming a metal film on a flexible dielectric substrate, and stretching the substrate and the metal film at a temperature equal to or below the melting point of the metal film (refer to Japanese Unexamined Patent Application Publication No. 2001-74935). A fourth method includes the step of transferring a minute pattern onto a hydrophobic thin film and a hydrophilic thin film by using nanoimprint lithography technology, and growing thin metallic wires by plating method (refer to Japanese Unexamined Patent Application Publication No. 2005-70456). A fifth method is a mass production method including the step of patterning a polymer film formed on a substrate by using embossing technique, and the step of forming a metal layer thereon and thereafter removing the polymer film, thereby obtaining a patterned metal structure (refer to Japanese Unexamined Patent Application Publication No. 2006-84776).

SUMMARY OF THE INVENTION

However, the above first to third manufacturing methods using lithography method have the disadvantages that the number of used materials and steps are large because after the material of the metal layer of the wire grid is formed on the entire surface of the substrate, a resist coating step, an exposure step, a development step and an etching step are carried out, followed by patterning. The fourth method employing the nanoimprint lithography technology and the fifth method employing the embossing technique using the polymer film also necessitate a large number of steps.

It is desirable to provide a polarizer capable of being manufactured through simple steps, and a method of manufacturing the polarizer, as well as a liquid crystal projector.

According to an embodiment of the present invention, there is provided a polarizer including a substrate having light permeability, and a plurality of linear projections being arranged on the substrate and extending along one direction within a plane thereof. Each of the linear projections has a base layer and a plating layer in the named order from the substrate. The base layer contains a catalyst material for electroless plating process. The plating layer is deposited by using the base layer as a catalyst.

According to an embodiment of the present invention, there is provided a method of manufacturing a polarizer having the step of forming a plurality of linear projections on a light permeable substrate so as to extend in one direction within the plane thereof. The method includes the step of pattern forming a base layer containing a catalyst material for electroless plating process in a region for forming a plurality of linear projections on the substrate, and the step of forming the plurality of linear projections by forming a plating layer on the base layer by performing electroless plating process using the base layer as a catalyst, to the substrate provided with the base layer.

According to an embodiment of the present invention, there is provided a liquid crystal projector including a light source, a liquid crystal panel to modulate light from the light source based on a video signal, a pair of polarizers arranged on the light incident side and the light emitting side of the liquid crystal panel, and a projection lens to project light modulated by the liquid crystal panel. At least one of the pair of polarizers includes a substrate having light permeability, and a plurality of linear projections being arranged on the substrate and extending along one direction within a plane thereof. Each of the linear projections has a base layer and a plating layer in the named order from the substrate. The base layer contains a catalyst material for electroless plating process. The plating layer is deposited by using the base layer as a catalyst.

In the method of manufacturing a polarizer of the embodiment of the invention, the plating layer is deposited correspondingly to the pattern of the base layer formed on the substrate by pattern forming the base layer containing the catalyst material for electroless plating process, on the region for forming a plurality of linear projections on the substrate, and performing electroless plating process using the base layer as a catalyst.

The plurality of linear projections are able to be formed by a smaller number of steps than that of lithography method or the like. This enables the polarizer to be manufactured through simple steps.

In the polarizer and the liquid crystal projector of the embodiment of the invention, in the polarizer, each of the plurality of linear projections arranged on the substrate having light permeability has, in the named order from the substrate, the base layer containing the catalyst material for electroless plating process, and the plating layer deposited by using the base layer as a catalyst. Owing to this arrangement, the pattern formation of the plurality of linear projections becomes possible by performing the pattern formation of the base layer on the substrate, and performing electroless plating process using the base layer as a catalyst.

This enables the polarizer and the liquid crystal projector to be manufactured through simple steps.

Other and further objects, features and advantages of the invention will appear more fully from the following description.

BRIEF DESCRIPTION OF THE DRAWINGS

FIGS. 5A and 5B are sectional views showing the steps subsequent to those shown in FIGS. 3A and 3B and FIG. 4;

FIGS. 6A and 6B are sectional views showing a method of manufacturing a polarizer in the order of steps according to another embodiment of the invention;

FIGS. 7A and 7B are sectional views showing the steps subsequent to those shown in FIGS. 6A and 6B;

FIGS. 8A and 8B are sectional views showing the steps subsequent to those shown in FIGS. 7A and 7B;

FIG. 9 is a sectional view showing the schematic configuration of a polarizer according to a modification of the polarizer shown in FIG. 1;

DESCRIPTION OF THE PREFERRED EMBODIMENTS

Preferred embodiments of the present invention will now be described in detail with reference to the accompanying drawings.

First Embodiment

Figure 1:
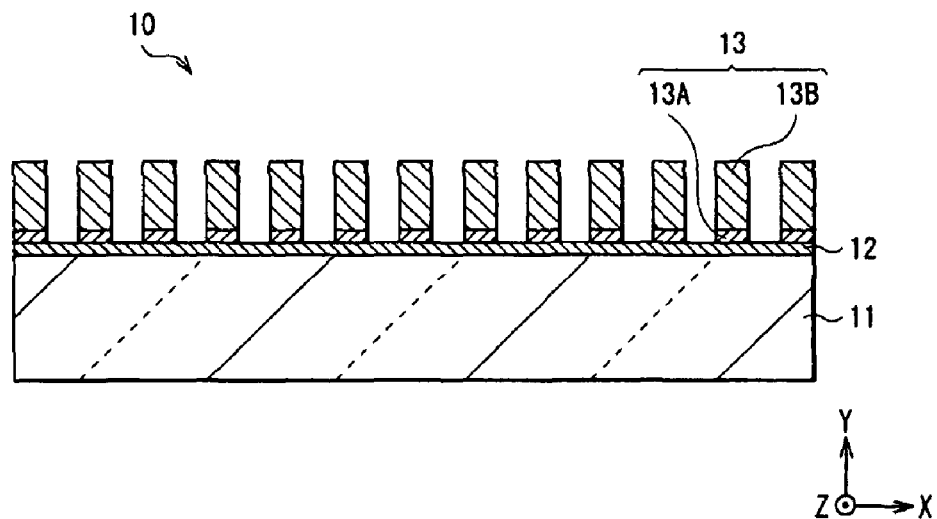
FIG. 1 is a sectional view showing the schematic configuration of a polarizer according to an embodiment of the invention.

FIG. 1 is a sectional view showing the schematic configuration of a polarizer 10 according to a first embodiment of the invention.

The polarizer 10 is an optical element to transmit only specific polarized light, that is, a wire grid polarizer formed by using an inorganic material. The polarizer 10 includes an adhesion layer 12 formed on the surface of a substrate 11, and a plurality of linear projections 13 formed on the adhesion layer 12 by means of pattern formation. These linear projections 13 extend along the Z direction and are arranged along the X direction in the drawing. In the individual linear projections 13, a base layer 13A and a plating layer 13B are laminated in the named order from the substrate 11.

The substrate 11 is constructed from a substrate having transparency in the visible light region, specifically an optical glass such as synthetic quartz or glass, and has a thickness of 0.5 mm to 3.0 mm, for example. Alternatively, boro-silicated glass BK7 may be used as the substrate 11.

The adhesion layer 12 is used to improve the adhesiveness of the base layer 13A to the substrate 11. The adhesion layer 12 is composed of, for example, silane coupling agent, such as those containing at least one of amino-based silane compound, mercapto-based silane compound, phenyl-based silane compound and alkyl-based silane compound. The material of the adhesion layer 12 may be selected suitably depending on the materials constituting the base layer 13A and the substrate 11.

A plurality of the linear projections 13 are arranged in a pattern having, for example, a width of 50 nm to 100 nm in the X direction and a pitch of 100 nm to 150 nm. This permits transmission of the light in the visible light wavelength region.

The base layer 13A contains a catalyst material for electroless plating process to be described later, specifically at least one of palladium (Pd), gold (Au), platinum (Pt) and silver (Ag), and has a thickness of several nm to several tens nm.

The plating layer 13B is deposited to have a thickness of 100 nm to 200 nm by the later-described electroless plating process using the base layer 13A as a catalyst. The plating layer 13B is composed of a simple substance of metal such as nickel (Ni), copper (Cu), gold (Au), silver (Ag), palladium (Pd), cobalt (Co), platinum (Pt), indium (In), tin (Sn), rhodium (Rh) or the like. In addition, a metal codepositable with these metals may be used together. Examples thereof are phosphorous (P), boron (B), chromium (Cr), manganese (Mn), iron (Fe), zinc (Zn), molybdenum (Mo), cadmium (Cd), tungsten (W), rhenium (Re), titanium (Ti), sulfur (S) and vanadium (V).

Here, the material constituting the plating layer 13B is suitably selected depending on the material constituting the base layer 13A functioning as the catalyst for electroless plating process.

The laminate structure of the linear projections 13 in the polarizer 10 is specified by, for example, the following methods (1) to (3).

(1) The catalyst material for electroless plating process (the base layer 13A) is detected by observing the cross-section of the linear projections 13 on a transmission electron microscope (TEM) or the like.

(2) For example, secondary ion-microprobe mass spectrometer (SIMS) or X-ray photoelectron spectroscopy (XPS) is used to determine whether any codepositable metal is contained in the linear projections 13. In the case where the plating layer 13B contains nickel, it is determined whether boron and phosphorous are also contained together with nickel.

(3) For example, the SIMS is used to determine whether there is contained any additive such as an organic compound used for the electroless plating process.

A method of manufacturing the polarizer 10 thus configured will be described with reference to FIGS. 2A to 5B, which are sectional views showing the method of manufacturing the polarizer 10 in the order of the steps thereof.

1. Pattern Formation of Base Layer 13A

Figure 2A:
FIGS. 2A and 2B are sectional views showing a method of manufacturing the polarizer shown in FIG. 1 in the order of steps.

First, as shown in FIG. 2A, a master plate 200 is fabricated, which becomes the mold of a plate (a convex plate 201 described later) used for the pattern formation of the base layer 13A in a region for forming the linear projections 13. The concave-convex pattern of the master plate 200 is, for example, a fine periodic structure of submicron order, and is fabricated by exposure using electron beam and laser or photolithography method. These methods are also applied to nanoimprint technology. This enables to form the pattern with desired accuracy. As the master plate 200, silicon, quartz, nickel or the like may be used. That is, any material may be used as long as it does not cause any disadvantages in the succeeding process.

Figure 2B:
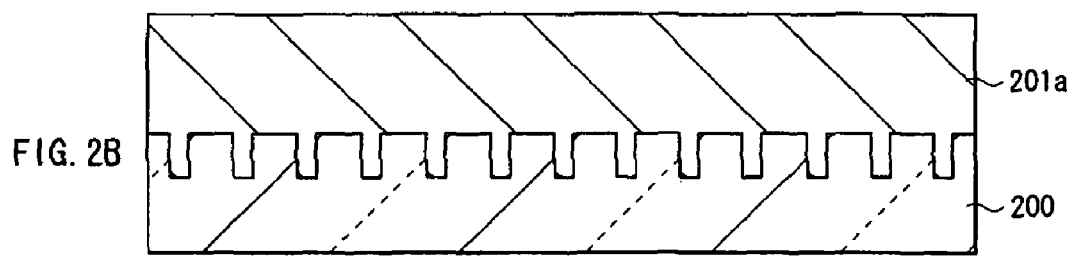
Figure 3A:
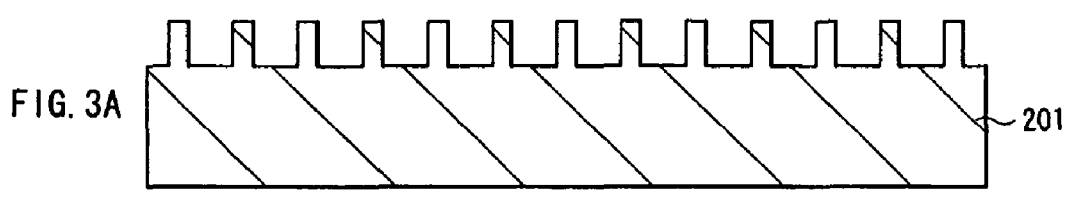
FIGS. 3A and 3B are sectional views showing the steps subsequent to those shown in FIGS. 2A and 2B.

Next, as shown in FIG. 2B, for example, polydimethylsiloxane (PDMS) 201a is poured into the fabricated master plate 200, and the reverse pattern of the concave-convex of the master plate 200 is copied onto a PDMS 201a. For example, a SYLGARD184 (product name, available from Dow Corning Toray Co., Ltd.) may be used as the PDMS 201a. Specifically, two solutions are mixed and stirred and then defoamed. The mixture is then heat-polymerized in a thermostat bath at 60° C. for 12 hours. This is used to manufacture the convex plate 201 for the pattern formation of the base layer 13A corresponding to a fine wire pattern, as shown in FIG. 3A.

Figure 3B:
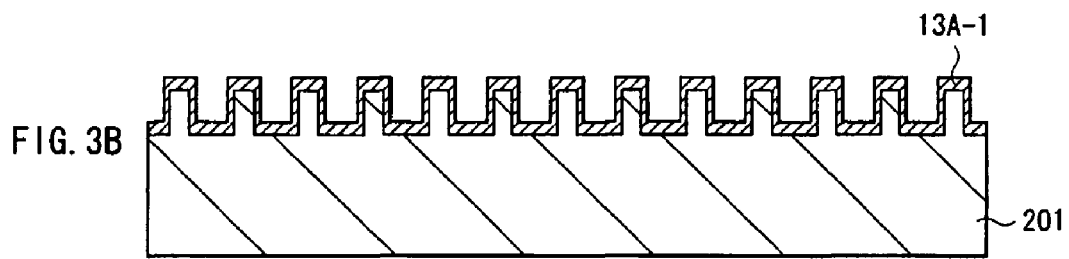

As shown in FIG. 3B, a catalyst layer 13A-1 is formed on the surface provided with the fabricated concave-convex pattern of the convex plate 201. The catalyst layer 13A-1 may be formed by coating solvent containing the above-mentioned catalyst material, such as solvent containing palladium fine particles and palladium complex, by using various coating methods such as dip coating method or spray method, and then drying the excess solvent by dry nitrogen. Alternatively, the catalyst layer 13A-1 may be formed by immersing the concave-convex pattern side of the convex plate 201 in a catalyst-imparting agent containing the above-mentioned catalyst material for several seconds to several minutes, followed by drying. As the catalyst-imparting agent, palladium catalyst-imparting agent ("OPC-50 Inducer," (product name) available from Okuno Chemical Industries Co., Ltd.) may be used.

Figure 4:
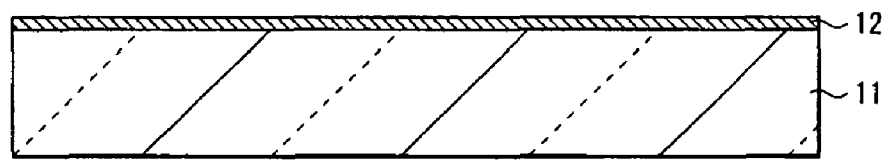
FIG. 4 is a sectional view showing the step of forming an adhesion layer on a substrate.

On the other hand, as shown in FIG. 4, the substrate 11 composed of the above-mentioned material is washed with an alkaline solution and then deionized water. After this is dried, the adhesion layer 12 is formed on the surface of the substrate 11. For example, the adhesion layer 12 is formed by subjecting the substrate 11 to a surface treatment by vapor phase method or spin coating method using silane coupling agent. When the vapor phase method is used, a glass bottle accommodating the substrate 11 and the silane coupling agent is put in a container made of Teflon (registered trademark), and the entire container is put into an oven and heated at, for example, at 120° C. for 12 hours. Thereafter, the excessive silane coupling agent (the silane coupling agent not bonded to the glass substrate) is able to be removed by performing ultrasonic cleaning with solvent such as ethanol or water capable of dissolving the silane coupling agent. For example, N-2(aminoethyl)3-aminopropyltrimethoxysilane ("KBM-603" (product name), available from Shin-Etsu Co., Ltd.) may be used as the silane coupling agent.

Subsequently, as shown in FIG. 5A, the substrate 11 provided with the adhesion layer 12 and the convex plate 201 provided with the catalyst layer 13A-1 are stacked and pressure-bonded together so that the adhesion layer 12 and the catalyst layer 13A-1 are opposed each other. At this time, the adhesion layer 12 and the catalyst layer 13A-1 formed on the convex surface of the concave-convex pattern of the convex plate 201 are brought into contact at a low pressure of approximately 5 kPa or below, while avoiding contact of the portions other than the convex surface (i.e., the concave portions) of the concave-convex pattern of the convex plate 201. This is because the desired pattern may not be obtained due to the contact of the concave portions.

Subsequently, as shown in FIG. 5B, the pressure-bonded convex plate 201 and the substrate 11 are separated from each other, so that only the catalyst layer 13A-1 formed on the convex surface of the convex plate 201 is collectively transferred onto the adhesion layer 12 on the substrate 11. The adhesiveness of the transferred catalyst layer 13A-1 to the substrate 11 is able to be enhanced by heating the substrate 11 provided with the transferred catalyst layer 13A-1 at 100° C. to 150° C. in the atmosphere. This enables the pattern formation of the base layer 13A on the adhesion layer 12 on the substrate 11.

2. Electroless Plating Process

Finally, the plating layer 13B is deposited on the base layer 13A by applying electroless plating process to the substrate 11 provided with the base layer 13A. When nickel is deposited as a plating film, for example, a Ni—B plating solution for film formation "BEL 801" (product name, available from Uemura Kogyo Kabushiki Kaisha) may be used as a plating solution. The plating bath temperature is, for example, 60° C., and the immersing time may be suitably set depending on the desired film thickness. The film forming rate is, for example, 200 nm/min. Through the foregoing steps, the polarizer 10 shown in FIG. 1 is fabricated.

Thus, in the method of manufacturing the polarizer 10 according to the first embodiment, the plating layer 13B corresponding to the pattern of the base layer 13A is formed by applying the electroless plating process to the substrate 11 subjected to the pattern formation of the base layer 13A containing the catalyst material for the electroless plating process.

In particular, the convex plate 201 is fabricated by using the master plate 200 having the concave-convex pattern corresponding to the minute pattern of the linear projections 13. Thereafter, the catalyst layer 13A-1 is formed on the convex plate 201, and the catalyst layer 13A-1 and the adhesion layer 12 on the substrate 11 are pressure-bonded together, so that the base layer 13A is transferred onto the region for forming the linear projections 13 on the adhesion layer 12 of the substrate 11.

In the method of manufacturing the polarizer 10 according to the first embodiment, the base layer 13A is able to be collectively formed on the substrate 11 in a desired pattern by forming the catalyst layer 13A-1 on the convex plate 201 fabricated by using the master plate 200, and pressure-bonding the catalyst layer 13A-1 and the adhesion layer 12 on the substrate 11. Then, the plating layer 13B corresponding to the pattern of the base layer 13A is formed by performing the electroless plating process using the base layer 13A as a catalyst. Accordingly, the plurality of linear projections 13 is able to be formed in a minute pattern by a smaller number of steps than that of lithography method or the like. Hence, the polarizer 10 composed of the inorganic material such as wire grids is able to be manufactured through simple steps.

Second Embodiment

FIGS. 6A to 8B are sectional views showing a method of manufacturing a polarizer in the order of steps according to a second embodiment of the invention. Except for the step of pattern forming the base layer 13A, the polarizer 10 as shown in FIG. 1 is fabricated in the same manner as the above-mentioned method of manufacturing the polarizer 10 according to the first embodiment. Therefore, the step of the pattern formation of the base layer 13A will be described below. The same references have been retained for the same components as the first embodiment, and the overlapped description is omitted here.

Firstly, as shown in FIG. 6A, a flat plate 202 having no concave-convex pattern on the surface thereof is fabricated. The flat plate 202 may be fabricated by, for example, coating PDMS on a glass substrate by using spin coating method. Alternatively, the flat plate 202 may be fabricated by holding two fluorinated glass substrates with a gap therebetween formed by a spacer, and pouring PDMS between these two glass substrates, followed by curing.

As shown in FIG. 6B, a catalyst layer 13A-1 is formed over the entire surface of the fabricated flat plate 202. In the same manner as in the first embodiment, the catalyst layer 13A-1 is formed by coating solvent containing the above-mentioned catalyst material by using various types of coating methods, followed by drying.

As shown in FIG. 7A, a master plate 200 is pressure-bonded against the catalyst layer 13A-1 formed on the flat plate 202 at pressure of, for example, 5 kPa or below. At this time, the surface of the master plate 200 provided with the concave-convex pattern is opposed to the catalyst layer 13A-1, and only the convex surface of the concave-convex pattern is contacted with the catalyst layer 13A-1. Alternatively, the master plate 200 may be the same one used as the mold for forming the convex plate 201 in the first embodiment.

As shown in FIG. 7B, the master plate 200 is removed from the flat plate 202, thereby transferring the catalyst layer 13A-1 onto the portions being in contact with the master plate 200, namely the convex surface of the master plate 200. On the other hand, the catalyst layer 13A-1 in the region corresponding to the concave portions of the master plate 200 remains on the flat plate 202. Thus, the pattern formation of the base layer 13A is completed.

As shown in FIG. 8A, the flat plate 202 having thereon the base layer 13A by means of pattern formation, and the substrate 11 having thereon the adhesion layer 12 formed in the same manner as above are stacked together so that the base layer 13A and the adhesion layer 12 are opposed each other, and then pressure-bonded at a pressure, for example, 5 kPa or below.

As shown in FIG. 8B, the flat plate 202 is removed from the substrate 11, so that the pattern of the base layer 13A is transferred onto the adhesion layer 12. A plating layer 13B is formed by performing electroless plating process using, as a catalyst, the base layer 13 formed by means of pattern formation.

In the second embodiment, the catalyst layer 13A-1 is formed over the entire surface of the flat plate 202, and thereafter the master plate 200 is pressure-bonded against the catalyst layer 13A-1. This enables the base layer 13A to be formed on the flat plate 202 in a desired pattern. Subsequently, the base layer 13A formed on the flat plate 202 by means of pattern formation is pressure-bonded against the adhesion layer 12 formed on the substrate 11. This enables the base layer 13A to be collectively formed in a desired pattern on the substrate 11. Thus, it is also capable of transferring the base layer 13A by using the flat plate having no concave-convex pattern thereon.

Modifications

Modifications of the first and second embodiments will be described below with reference to FIG. 9.

FIG. 9 is a sectional view showing the schematic configuration of a polarizer 40 according to a modification. The polarizer 40 has the same configuration as the polarizer shown in FIG. 1, except that a reflection preventing layer 41 is formed on a surface of the substrate 11 opposite the linear projections 13 (hereinafter referred to as the back). Therefore, the description of the same configuration as the first and second embodiments is omitted here.

The reflection preventing layer 41 is used to prevent optical reflection, and constructed from, for example, a single layer of $MgF_2$ as a low refractive index material, or a multilayer film containing $MgF_2$ and $SiO_2$ as a low refractive index material, and $TiO_2$ and $ZrO_2$ as a high refractive index material. The reflection preventing layer 41 may be formed by forming a film of the above-mentioned material on the back of the substrate 11 by using sputtering method, vacuum deposition method or the like.

In the present modification, the reflection of incident or emitted light is prevented to improve light use efficiency by forming the reflection preventing layer 41 on the back of the substrate 11. Thus, an optical layer such as the reflection preventing layer may be disposed on the back of the substrate 11.

Application Example

An application example of the polarizer 10 described in the first and second embodiments (a liquid crystal projector 1) will be described with reference to FIG. 10.

Figure 10:
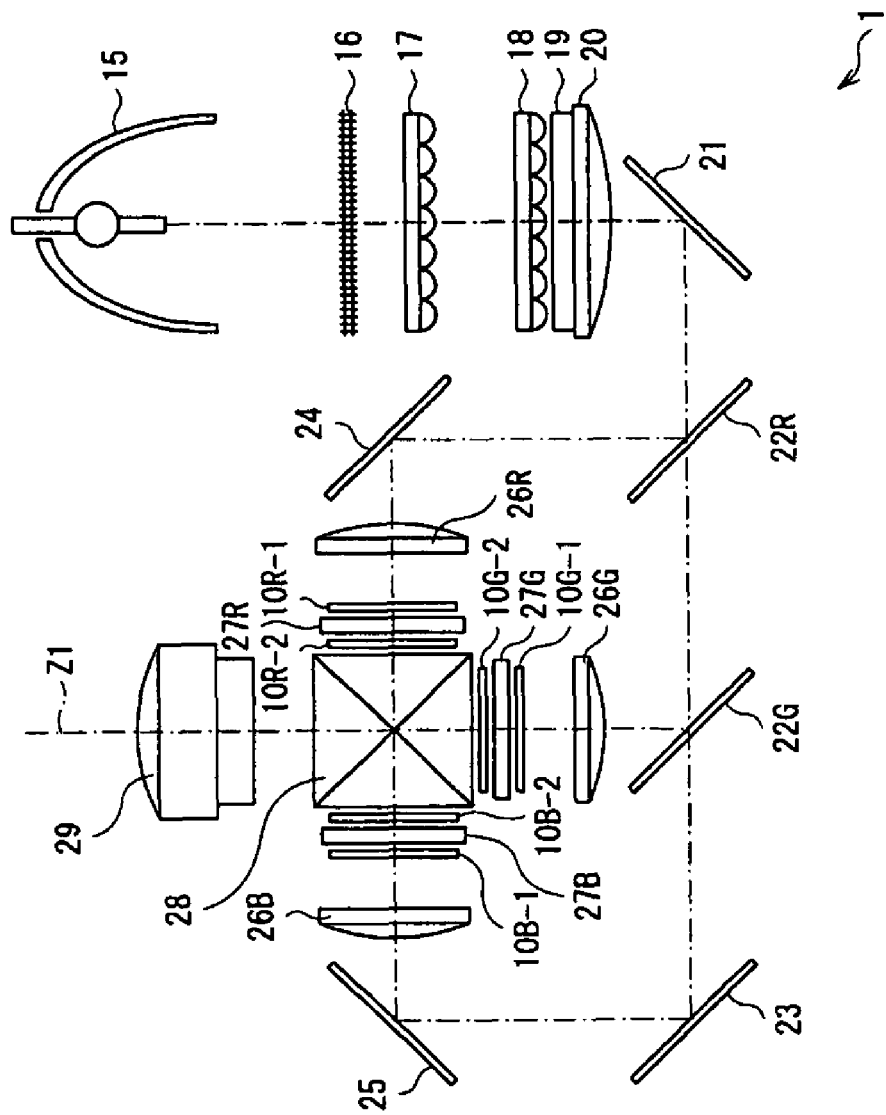
FIG. 10 is a sectional view showing the schematic configuration of a liquid crystal projector according to an application example of the polarizer shown in FIG. 1.
Figure 11:
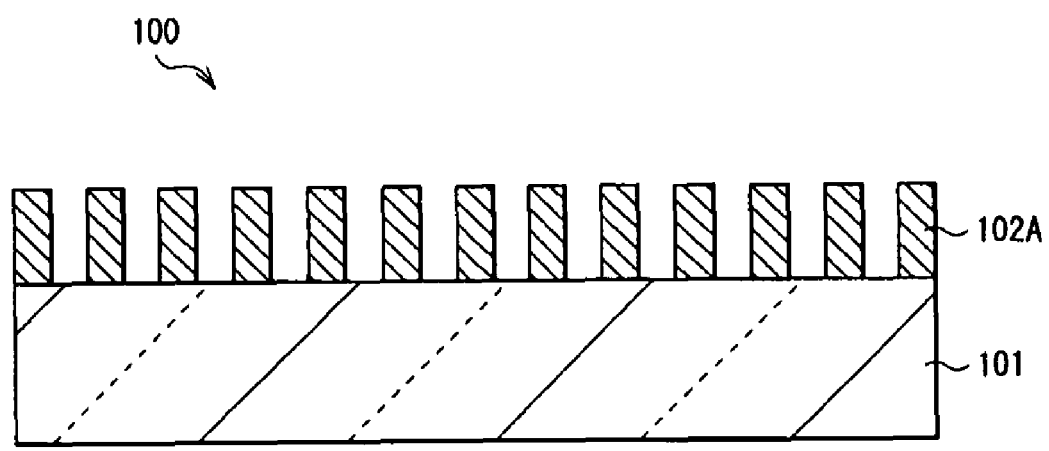
FIG. 11 is a sectional view showing the schematic configuration of a polarizer of related art.

FIG. 10 shows the schematic configuration of the liquid crystal projector 1. The liquid crystal projector 1 is a front type or rear type projector apparatus configured to perform display by generating image light by modulating the light from a light source through a liquid crystal panel, and enlarge-projecting the image light. The liquid crystal projector 1 has, on an optical axis Z1, a lamp 15, a UV/IR cut filter 16, micro-lens arrays 17 and 18, a PS polarized light synthesizing element 19, a condenser lens 20, a mirror 21, dichloic mirrors 22R and 22G, mirrors 23, 24 and 25, light collecting lens 26R, 26G and 26B, liquid crystal panels 27R, 27G and 27B, cross prism 28 and a projection lens 29. In this configuration, polarizers 10R-1, 10R-2, 10G-1, 10G-2, 10B-1 and 10B-2 are mounted on the light incident side and the light emitting side of the liquid crystal panels 28R, 28G and 28B, respectively. These polarizers 10R-1, 10R-2, 10G-1, 10G-2, 10B-1 and 10B-2 correspond to the polarizer 10 according to the first or second embodiment.

The lamp 15 is a light source for white light emission, and includes, for example, a light emitting body and a concave mirror (a reflecting mirror). As the light emitting body, a lamp having a continuous emission spectrum over the entire wavelength region of visible light, for example, a xenon lamp such as a UHP lamp is used.

The UV/IR cut filter 16 is an optical filter for cutting the light of ultraviolet and infrared wavelength regions. The micro-lens arrays 17 and 18 function as, for example, a fly's eye lens system, and are disposed to uniformly diffuse the light from the light source. The PS conversion element 19 is disposed to increase light use efficiency by converting one polarized light to the other polarized light. The condenser lens 20 is disposed to collect the light emitted from the PS polarized light synthesizing element.

The mirrors 21, 23, 24 and 25 are disposed to change the optical path at predetermined locations, respectively, based on the internal structure of the projector apparatus. The dichloic mirrors 22R and 22G are disposed to separate the light after being subjected to the optical path change by the mirror 21, into three color lights of R (red), G (green) and B (blue). In the present application example, the dichloic mirror 22R reflects only red light and transmits lights in other wavelength regions (green light and blue light). The dichloic mirror 22G reflects only green light and transmits light in other wavelength region (blue light).

The liquid crystal panels 27R, 27G and 27B are transmission type light modulation elements to generate image light by modulating and transmitting the three color lights of R, G and B separated by the dichloic mirrors 22R and 22G, based on their respective video signals. A pair of the polarizers 10R-1 and 10R-2 are arranged so that their polarizing axes are orthogonal to each other, on the light incident side and the light emitting side of the liquid crystal panel 27R. Similarly, the polarizers 10G-1 and 10G-2 are arranged with respect to the liquid crystal panel 27G, and the polarizers 10B-1 and 10B-2 are arranged with respect to the liquid crystal panel 27B.

The cross prism 28 is a light synthesizing element to synthesize the image lights generated per color by the liquid crystal panels 27R, 27G and 27B. The projection lens 29 is a lens system to enlarge and project the image light synthesized by the cross prism 28.

In the liquid crystal projector 1 thus configured, the light from the lamp 15 is transmitted through the UV/IR cut filter 16, the micro-lens arrays 17 and 18, the PS polarized light synthesizing element 19 and the condenser lens 20 in this order, and subjected to the optical path change by the mirror 21, and then separated into the three color lights by the dichloic mirror 22R and 22G. These separated color lights are guided to their respective predetermined optical paths by the mirrors 23, 24 and 25, and enter the liquid crystal panels 27R, 27G and 27B, each having a pair of the polarizers. The liquid crystal panels 27R, 27G and 27B generate image lights per color, and these image lights are synthesized by the cross prism 28 and then projected by the projection lens 29.

While the present invention has been described by the foregoing embodiment and examples, without limiting to these, many changes and modifications may be made.

Although the configuration examples that the thirteen linear projections are formed on the substrate 11 at the predetermined width and pitch have been described in the foregoing embodiments, the number, width and pitch of these linear projections may be suitably set depending on the characteristics of a necessary polarizer.

Although the liquid crystal projector configuration using the transmission type liquid crystal panels is exemplified as an application example of the polarizer, it is also possible to apply to liquid crystal projectors using reflection type liquid crystal panels. Although the three-plate type configuration to perform color display by using the three liquid crystal panels is exemplified above, it is also possible to apply to two-plate type or a single-plate type configuration.

Although in the foregoing embodiments or the like, the lamp emitting white light is exemplified as the light source of the liquid crystal projector, other light sources, such as semiconductor lasers and solid lasers, or alternatively LEDs may be used by suitably changing the optical components configuration of the above-mentioned liquid crystal projector.

The polarizers fabricated according to the invention are not limited to the above-mentioned liquid crystal projector, and are also applicable to, for example, thin wire grid polarizers for use in optical communication and optical recording.

The materials and thicknesses of the individual components or the film forming methods and film forming conditions described in the foregoing embodiments or the like are cited merely by way of example and without limitation. That is, other materials and thicknesses may be applied, and other film forming methods and other film forming conditions may be employed.

It should be understood by those skilled in the art that various modifications, combinations, sub-combinations and alterations may occur depending on design requirements and other factors insofar as they are within the scope of the appended claims or the equivalents thereof.

What is claimed is:

1. A polarizer comprising:
    a substrate having light permeability; and
    a plurality of linear projections arranged on the substrate and extending along one direction within a plane thereof, wherein
    each of the linear projections having an adhesion layer, a base layer and a plating layer in order from the substrate, the base layer containing a catalyst material for electroless plating process, and the plating layer being deposited by using the base layer as a catalyst, wherein the adhesion layer is comprised of a silane coupling agent.

2. The polarizer according to claim 1, wherein a light reflection preventing film is formed on a surface of the substrate opposite the plurality of linear projections.

3. A liquid crystal projector comprising:
    a light source;
    a liquid crystal panel to modulate light from the light source based on a video signal;
    a pair of polarizers arranged on the light incident side and the light emitting side of the liquid crystal panel; and
    a projection lens to project light modulated by the liquid crystal panel,
    wherein at least one of the pair of polarizers includes
    a substrate having light permeability, and
    a plurality of linear projections being arranged on the substrate and extending along one direction within a plane thereof,
    each of the linear projections having an adhesion layer, a base layer and a plating layer in order on the substrate, the base layer containing a catalyst material for electroless plating process, and the plating layer being deposited by using the base layer as a catalyst, wherein the adhesion layer is comprised of a silane coupling agent.

4. The liquid crystal projector according to claim 3, wherein the light source is configured
    to emit light in a wavelength region of visible light.

* * * * *